US010094707B2

(12) United States Patent
Morimiya et al.

(10) Patent No.: US 10,094,707 B2
(45) Date of Patent: Oct. 9, 2018

(54) OPTICAL ATTENUATOR

(71) Applicant: Nissan Motor Co., Ltd.

(72) Inventors: Naoyuki Morimiya, Kanagawa (JP); Naoyuki Torii, Kanagawa (JP); Naoki Okamoto, Kanagawa (JP); Naoya Yoshida, Kanagawa (JP); Tsuneo Saito, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/549,713

(22) PCT Filed: Feb. 9, 2016

(86) PCT No.: PCT/JP2016/053800
§ 371 (c)(1),
(2) Date: Aug. 9, 2017

(87) PCT Pub. No.: WO2016/147752
PCT Pub. Date: Sep. 22, 2016

(65) Prior Publication Data
US 2018/0031417 A1 Feb. 1, 2018

(30) Foreign Application Priority Data

Mar. 13, 2015 (JP) .................................. 2015-050988

(51) Int. Cl.
| | |
|---|---|
| *G01J 1/04* | (2006.01) |
| *G01J 1/02* | (2006.01) |
| *H01S 3/00* | (2006.01) |
| *G02B 5/00* | (2006.01) |
| *G02B 7/00* | (2006.01) |

(Continued)

(52) U.S. Cl.
CPC ............... *G01J 1/0418* (2013.01); *G01J 1/02* (2013.01); *G02B 5/003* (2013.01); *G02B 7/008* (2013.01); *G02B 27/108* (2013.01); *G02B 27/126* (2013.01); *H01S 3/00* (2013.01)

(58) Field of Classification Search
CPC .... G02B 27/10; G02B 27/1073; G02B 27/14; G02B 5/00; G02B 5/003; G02B 5/005; H01S 3/11; H01S 3/1305
USPC ........ 372/10, 20, 25, 18; 359/618, 629, 638, 359/639, 640
See application file for complete search history.

(56) References Cited

FOREIGN PATENT DOCUMENTS

| | | |
|---|---|---|
| CN | 201387509 Y | 1/2010 |
| CN | 103616765 A | 3/2014 |

(Continued)

*Primary Examiner* — Robert E Tallman
(74) *Attorney, Agent, or Firm* — Global IP Counselors, LLP (57) ABSTRACT

An optical attenuator has a sampling prism, a biconcave lens and an absorption member. A branch member splits a laser beam. An expansion member expands the shape of the split laser beam. The absorption member absorbs the energy of the expanded laser beam. A light receiving part of the absorption member receives the expanded laser beam. A first distribution part of the absorption member adjacent to the light receiving part, introduces or leads out a medium (cooling water) from a first opening and distributes the medium, which absorbs heat generated in the light receiving part by the laser beam. A second distribution part of the absorption member leads out or introduces cooling water from a second opening, and distributes the cooling water, which moves through a communicating part that communicates with the first distribution part.

20 Claims, 7 Drawing Sheets

(51) Int. Cl.
*G02B 27/10* (2006.01)
*G02B 27/12* (2006.01)

(56) References Cited

FOREIGN PATENT DOCUMENTS

| | | |
|---|---|---|
| CN | 204045926 U | 12/2014 |
| DE | 102012219635 A1 | 2/2014 |
| JP | 8-18126 A | 1/1996 |
| JP | 10-326931 A | 12/1998 |
| JP | 2015-38922 A | 2/2015 |

OPTICAL ATTENUATOR

CROSS-REFERENCE TO RELATED APPLICATIONS

This application is a U.S. National stage application of International Application No. PCT/JP2016/053800, filed Feb. 9, 2016. The present application is based on Japanese Patent Application No. 2015-050988, filed on Mar. 13, 2015, and the contents disclosed therein is hereby incorporated herein as a whole been referenced.

BACKGROUND

Field of the Invention

The present invention relates to an optical attenuator.

Background Information

Conventionally, there are devices that attenuate the intensity of a laser beam (for example refer to Japanese Laid-Open Patent Application No. Hei 10(1998)-326931 (Patent Document 1).

SUMMARY

In a configuration such as that in Patent Document 1 described above, in addition to a light shielding means and a plurality of light branching means, a light absorption means is provided to disperse the intensity of the laser beam in order to sufficiently attenuate a portion of a laser beam; therefore, the device becomes large-scale.

In order to solve the problem described above, an object of the present invention is to provide an optical attenuator that is capable, by means of a simple configuration, of sufficiently attenuating a portion of light to be measured.

The optical attenuator according to the present invention, which achieves the object described above, comprises a branch member, an expansion member, and an absorption member. The branch member splits light to be measured. The expansion member expands the shape of the split light. The absorption member absorbs the energy of the expanded light. The absorption member comprises a light receiving part, a first distribution part, and a second distribution part. The light receiving part receives the expanded light. The first distribution part is adjacent to the light receiving part, and introduces or leads out a medium from a first opening and distributes the medium, which medium absorbs light-generated heat in the light receiving part. The second distribution part leads out or introduces the medium from a second opening and distributes the medium, which medium moves through a communicating part that communicates with the first distribution part.

BRIEF DESCRIPTION OF THE DRAWINGS

Referring now to the drawings, an optical attenuator is illustrated that is part of a laser oscillator and an intensity distribution measuring device.

DETAILED DESCRIPTION OF THE EMBODIMENTS

Embodiments according to the present invention will be described below, with reference to the appended drawings. In the explanations of the drawings, the same elements are given the same reference symbols, and overlapping explanations are omitted. The sizes and ratios of the members in the drawing are exaggerated for convenience of explanation, and may be different from the actual sizes and ratios.

In one embodiment, the optical attenuator 100 is incorporated in an intensity distribution measuring device 200 that measures the intensity distribution of a laser beam L, which corresponds to the light to be measured. The optical attenuator 100 splits the laser beam L from a laser oscillator 300. The optical attenuator 100 attenuates one of the split laser beams L1 (a large portion of the laser beam L, for example, 90-99%), while propagating the other split laser beam L3 (a very small portion of the laser beam L, for example 10-1%) toward the intensity distribution measuring device 200. The intensity distribution measuring device 200 measures the intensity distribution of the other laser beam L3 that is split by the optical attenuator 100. Therefore, in the embodiment, the intensity distribution measuring device 200 will be described in addition to the optical attenuator 100.

Figure 3:
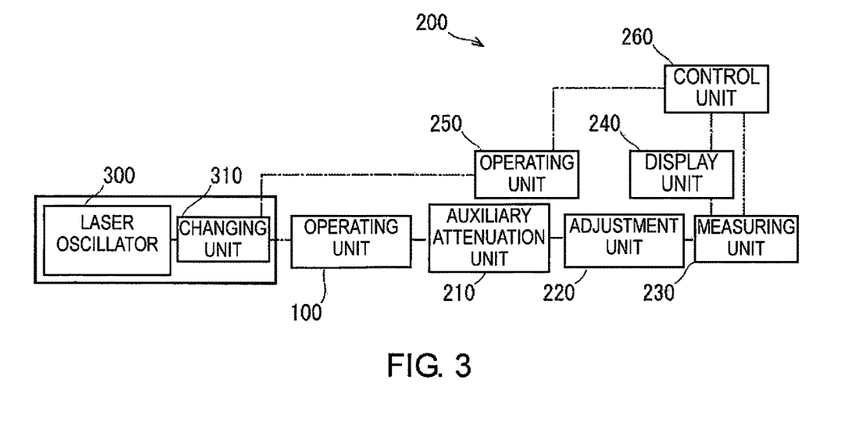
FIG. 3 is a block diagram illustrating the laser oscillator and the intensity distribution measuring device that incorporates the optical attenuator.
Figure 4:
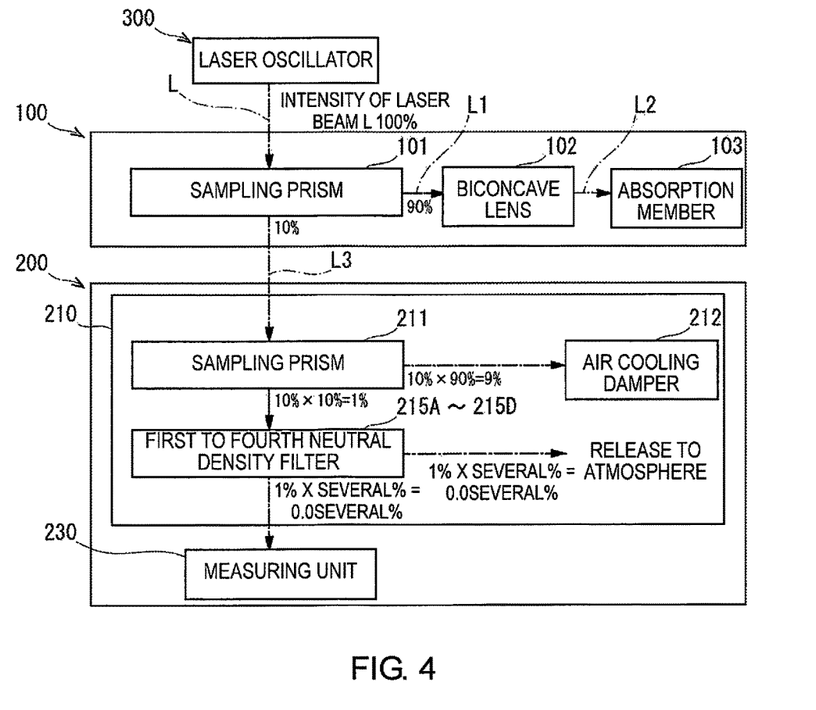
FIG. 4 is a block diagram illustrating the laser oscillator and the principle parts of the optical attenuator and the intensity distribution measuring device.
Figure 5:
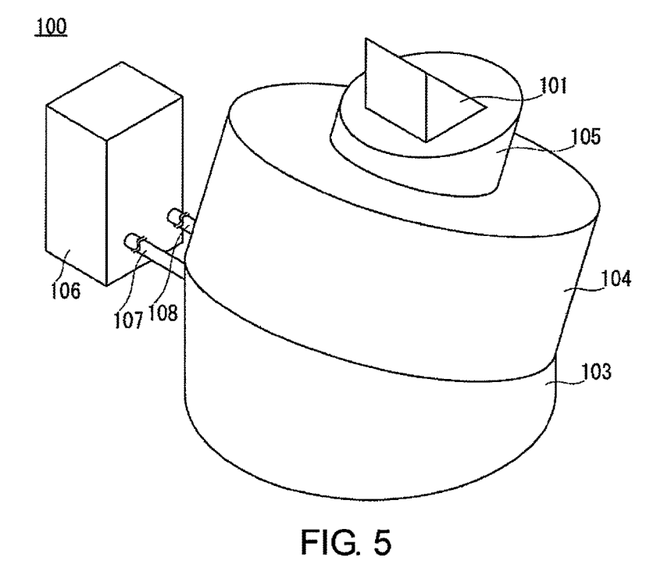
FIG. 5 is a perspective view illustrating the optical attenuator.
Figure 6:
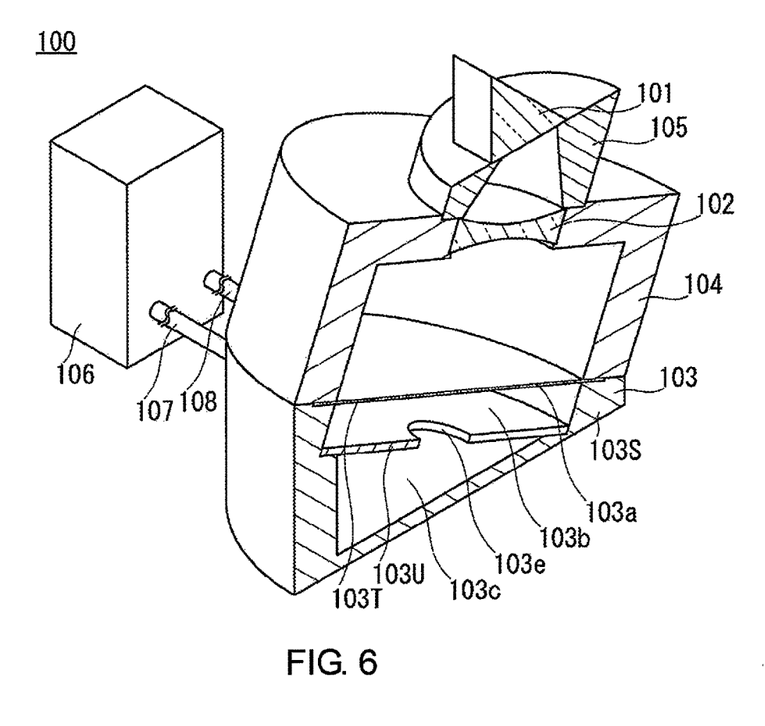
FIG. 6 is a perspective cross sectional view illustrating the optical attenuator.

First, the configuration of the optical attenuator 100 will be described with reference particularly to FIGS. 5-7 from among FIGS. 1-7.

Figure 1:
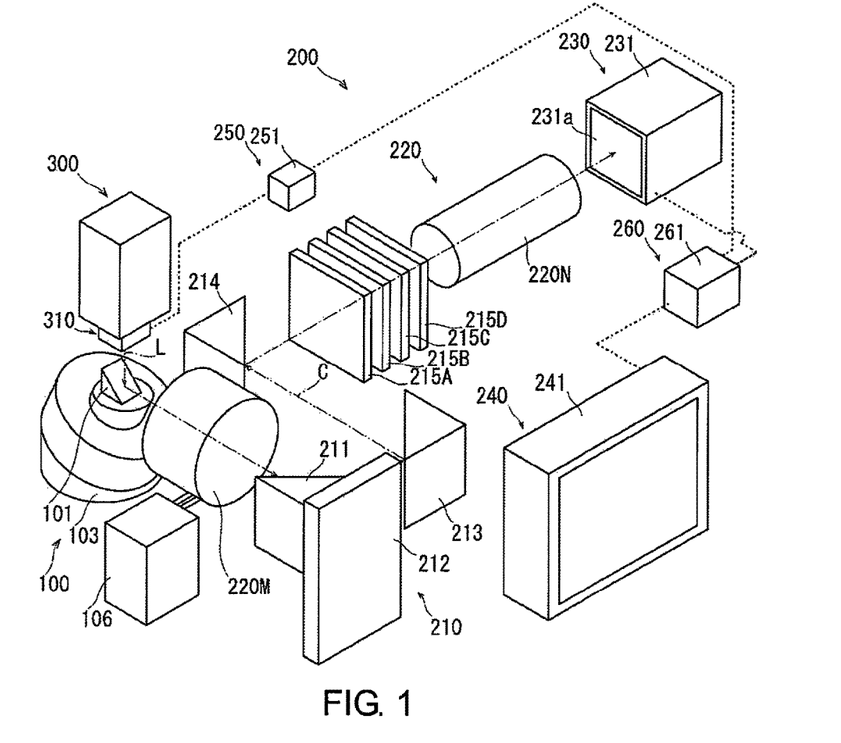
FIG. 1 is a perspective view illustrating a laser oscillator and an intensity distribution measuring device that incorporates the optical attenuator according to the embodiment.
Figure 2:
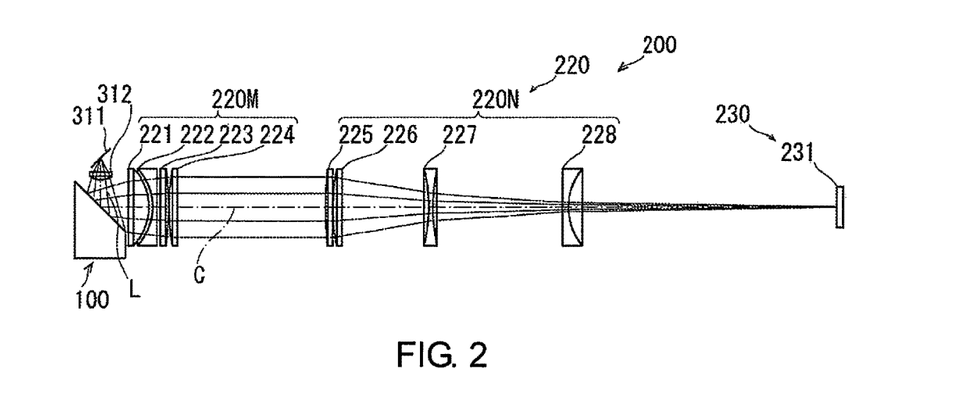
FIG. 2 is a schematic view illustrating the principle parts of the laser oscillator and the intensity distribution measuring device that incorporates the optical attenuator.

FIG. 1 is a perspective view illustrating a laser oscillator 300 and an intensity distribution measuring device 200 that incorporates the optical attenuator 100 according to the embodiment. FIG. 2 is a schematic view illustrating the principle parts of the laser oscillator 300 and the intensity distribution measuring device 200 that incorporates the optical attenuator 100. FIG. 3 is a block diagram illustrating the laser oscillator 300 and the intensity distribution measuring device 200 that incorporates the optical attenuator 100. FIG. 4 is a block diagram illustrating the laser oscillator 300, the principle parts of the optical attenuator 100, and the intensity distribution measuring device 200. FIG. 5 is a perspective view illustrating the optical attenuator 100. FIG.

6 is a cross sectional perspective view illustrating the optical attenuator 100. FIG. 7 is a schematic view illustrating the method of attenuating light (laser beam L2) in the optical attenuator 100.

The optical attenuator 100 sufficiently attenuates a portion of the laser beam L (light) to be measured. The optical attenuator 100 comprises, in addition to a branch member (sampling prism 101), an expansion member (biconcave lens 102), an absorption member 103, a first support member 104, a second support member 105, a constant temperature circulating water tank 106, an inlet tube 107, and an outlet tube 108, as, for example, illustrated in FIG. 7. The configuration of the optical attenuator 100 will be described below in order.

The sampling prism 101 corresponds to the branch member, and splits a laser beam L, which is the light to be measured.

The sampling prism 101 is, for example, made of quartz and formed in a prism shape. The sampling prism 101 splits the laser beam L from the laser oscillator 300. The sampling prism 101 transmits a laser beam L1, which is a large portion (for example 90%) of the laser beam L, from an interface 101a, while propagating the same toward the biconcave lens 102. On the other hand, the sampling prism 101 reflects a laser beam L3, which is a very small portion (for example 10%) of the laser beam L, at the interface 101a, while propagating the same toward the intensity distribution measuring device 200. The sampling prism 101 is fixed on the second support member 105.

The biconcave lens 102 corresponds to the expansion member, and expands the shape of the split laser beam L1.

The biconcave lens 102 expands the shape of the laser beam L1 to reduce the amount of energy of the laser beam L2 per unit area that is irradiated to the light receiving part 103a of the absorption member 103. In addition to a configuration in which the shape of the laser beam L1 itself is expanded, the expansion of the laser beam L1 by the expansion member includes a configuration in which the irradiation area is increased by irradiating the laser beam L1 at an oblique incidence with respect to the light receiving part 103a of the absorption member 103.

The biconcave lens 102 is, for example, made of quartz and formed in a circular shape in an axially perpendicular section. The incident surface 102a and the emitting surface 102b of the biconcave lens 102 are each formed in a concave shape. The transmittance of the biconcave lens 102 is increased by vapor deposition of antireflective films on the incident surface 102a and the emitting surface 102b. The biconcave lens 102 makes the laser beam L1, propagated from the sampling prism 101, incident from the incident surface 102a while expanding the same, and emits the laser beam from the emitting surface 102b while expanding the same.

The biconcave lens 102 is also able to deal with a laser beam L1 that is made incident from an oblique direction via a galvanometer mirror 311. The shape and propagation direction of the laser beam L2 that is emitted from the biconcave lens 102 can be arbitrarily set by optimizing the incident angle of the laser beam L1 with respect to the incident surface 102a, the curvature radius of the incident surface 102a, the curvature radius of the emitting surface 102b, and the material (the refractive index corresponding to the wavelength of the laser beam L). The biconcave lens 102 is fixedly attached to the first support member 104.

The absorption member 103 absorbs the energy of the expanded laser beam L2.

The absorption member 103 comprises a light receiving part 103a, a first distribution part 103b, and a second distribution part 103c. The light receiving part 103a receives the laser beam L2 that is expanded by the biconcave lens 102. The first distribution part 103b is adjacent to the light receiving part 103a, and introduces or leads out a cooling medium (cooling water W), which absorbs heat generated in the light receiving part 103a by the laser beam L2, from a first opening 103d, and distributes the medium. The second distribution part 103c leads out or introduces the cooling water W, which moves through a communicating portion 103e that communicates with the first distribution part 103b, from a second opening 103f, and distributes the cooling water.

Specifically, the absorption member 103 comprises a chassis 103S, a heat-absorbing plate 103T, and a separation plate 103U.

The chassis 103S is made of copper or aluminum with excellent thermal conductivity, and is formed in a cylindrical shape in which the upper portion is open and the lower portion is closed. The upper portion of the chassis 103S is tilted with respect to the horizontal direction. A first supporting portion 103Sa, recessed in an annular shape, is formed on the upper portion of the chassis 103S. The heat-absorbing plate 103T is attached and fixed to the first supporting portion 103Sa. A second supporting portion 103Sb, recessed in an annular shape and tilted with respect to the horizontal direction, is formed inside the chassis 103S. The separation plate 103U is attached and fixed to the second supporting portion 103Sb. In the chassis 103S, the space between the heat-absorbing plate 103T and the separation plate 103U corresponds to the first distribution part 103b. The first distribution part 103b is a cylindrically-shaped space that is tilted with respect to the horizontal direction. A first opening 103d for introducing the cooling water W in a circumferential direction along the inner circumferential surface of the first distribution part 103b is located at the outer edge of the first distribution part 103b of the chassis 103S. On the other hand, the space below the separation plate 103U in the chassis 103S corresponds to the second distribution part 103c. The second distribution part 103c is a space that is circular when viewed from above, and that is triangular when viewed from the side. A second opening 103f for leading the cooling water W out in a circumferential direction along the inner circumferential surface of the second distribution part 103c is located at the outer edge of the second distribution part 103c of the chassis 103S.

The heat-absorbing plate 103T absorbs heat generated accompanying the irradiation of the laser beam L2. The heat-absorbing plate 103T corresponds to the light receiving part 103a. The heat-absorbing plate 103T is made of copper or aluminum with excellent thermal conductivity, and is formed in a circular disk shape. The heat-absorbing plate 103T is attached to the first supporting portion 103Sa of the chassis 103S and fixed by bonding or welding. The heat-absorbing plate 103T is tilted with respect to the horizontal direction. The separation plate 103U partially separates the first distribution part 103b and the second distribution part 103c. By partitioning the chassis 103S with the separation plate 103U, for example, the first distribution part 103b functions as a cooling part, and the second distribution part 103c functions as a heat discharging part. The separation plate 103U is made of copper or aluminum with excellent thermal conductivity, and is formed in a circular disk shape that is open in the center. The open portion in the center of the separation plate 103U corresponds to the communicating portion 103e. The communicating portion 103e is positioned in the center of the portion in which the first distribution part 103b and the second distribution part 103c are adjacent to each other The separation plate 103U is tilted with respect to the horizontal direction.

The first support member 104 supports the biconcave lens 102 and the second support member 105.

The first support member 104 is made of copper or aluminum with excellent thermal conductivity, and is formed in a cylindrical shape in which the central portion of the upper portion 104a is open and the entire lower portion 104c is open. The upper portion 104a and the lower portion 104c of the first support member 104 are tilted with respect to the horizontal direction. The second support member 105 is fixed on the upper portion 104a of the first support member 104. The laser beam L2 that has been expanded by the biconcave lens 102 is propagated in an inner space portion 104b of the first support member 104. The lower portion 104c of the first support member 104 is fixed to the chassis 103S of the absorption member 103. The biconcave lens 102 is inserted and fixed in a mounting hole 104d that is opened in the central portion of the upper portion 104a of the first support member 104.

The second support member 105 supports the sampling prism 101.

The second support member 105 is made of copper or aluminum with excellent thermal conductivity, and has a cylindrical shape in which the upper portion 105a is cut away. The sampling prism 101 is fixed to the upper portion 105a of the second support member 105. The upper portion 105a of the second support member 105 is disposed in the horizontal direction. The laser beam L1 that has been split by the sampling prism 101 is propagated through an inner space portion 105b of the second support member 105. The space portion 105b of the second support member 105 has a truncated-cone shape with a diameter that increases from the upper side to the lower side. The sampling prism 101 is positioned on the upper side of the space portion 105b. The biconcave lens 102 is positioned on the lower side of the space portion 105b. The lower portion 105c of the second support member 105 is tilted with respect to the horizontal direction. The lower portion 105c of the second support member 105 is fixed to the upper portion 104a of the first support member 104.

The constant temperature circulating water tank 106, the inlet tube 107, and the outlet tube 108 circulates the cooling water W inside the absorption member 103.

The constant temperature circulating water tank 106 is a so-called chiller, and maintains the cooling water W, circulated inside the absorption member 103, at a constant temperature while feeding the water. The inlet tube 107 is made of a metal having rust preventing properties, and is formed in an elongated tubular shape. One end of the inlet tube 107 is connected to a discharge port of the constant temperature circulating water tank 106, and the other end is connected to the first opening 103d of the absorption member 103. The outlet tube 108 is made of a metal having rust preventing properties, and is formed in an elongated tubular shape. One end of the outlet tube 108 is connected to a return port of the constant temperature circulating water tank 106, and the other end is connected to the second opening 103f of the absorption member 103.

Next, the method of attenuating light (laser beam L2) in the optical attenuator 100 will be described with reference to FIG. 7.

Figure 7:
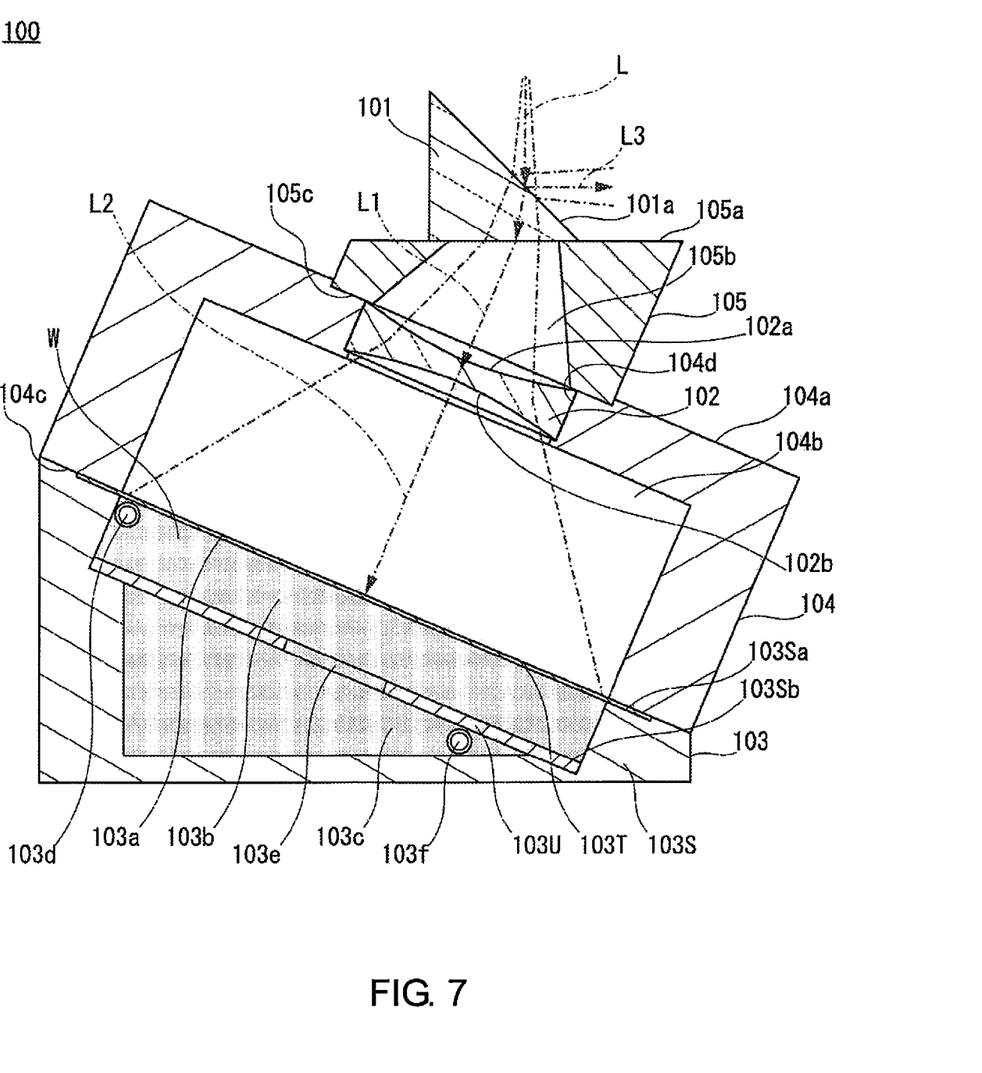
FIG. 7 is a schematic view illustrating the method of attenuating light in the optical attenuator.

FIG. 7 is a schematic view illustrating the method of attenuating light (laser beam L2) in the optical attenuator 100.

In the optical attenuator 100, the sampling prism 101 splits the laser beam L emitted from the laser oscillator 300. The sampling prism 101 transmits a laser beam L1, which is a large portion (for example 90%) of the laser beam L, from an interface 101a, while propagating the same toward the biconcave lens 102. On the other hand, the sampling prism 101 reflects a laser beam L3, which is a very small portion (for example 10%) of the laser beam L at the interface 101a, while propagating the same toward the intensity distribution measuring device 200. The biconcave lens 102 expands the shape of the split laser beam L1, while propagating the same toward the light receiving part 103a of the absorption member 103. The absorption member 103 receives the laser beam L2 by the light receiving part 103a. The absorption member 103 distributes cooling water W that has absorbed the energy of the laser beam L2 to the first distribution part 103b and the second distribution part 103c that communicate with each other via the communicating portion 103e, while attenuating the same.

In this manner, the optical attenuator 100 rapidly conducts the heat of the laser beam L2, which has come in contact with, and that has been absorbed by the light receiving part 103a, to a portion that is not in contact with the light receiving part 103a, while diffusing and absorbing the heat therein, with the cooling water W that has been mixed using communicating portion 103e.

Furthermore, due to the fact that the area of the opening of the communicating portion 103e is sufficiently smaller than the area of the portion where the first distribution part 103b and the second distribution part 103c are adjacent to each other, the optical attenuator 100 easily stirs and distributes the cooling water W in the absorption member 103, by temporarily compressing and expanding the cooling water W in the communicating portion 103e.

Furthermore, the optical attenuator 100 increases the contact area with the cooling water W in the absorption member 103, by distributing the cooling water W between the first distribution part 103b and the second distribution part 103c of the absorption member 103. That is, the entire absorption member 103 functions as a heat sink by conducting the heat of the laser beam L2, absorbed by the light receiving part 103a, to the first distribution part 103b and the second distribution part 103c.

In addition, the optical attenuator 100 distributes the cooling water W while cyclically winding the cooling water between the outer edge and the center of the first distribution part 103b of the absorption member 103. That is, the energy of the laser beam L2 is evenly absorbed by the cooling water W, which is cyclically wound and distributed inside the first distribution part 103b. In the same manner, the optical attenuator 100 distributes the cooling water W while cyclically winding the cooling water between the outer edge and the center of the second distribution part 103c of the absorption member 103. That is, the cooling water W is evenly led out while being cyclically wound and distributed in the second distribution part 103c.

Next, the intensity distribution measuring device 200 that incorporates the optical attenuator 100 will be described, with reference to FIGS. 1-4.

The intensity distribution measuring device 200 is a device for measuring the intensity distribution of a laser beam L that is scanned on a processing region of a member to be processed (for example, a workpiece that requires fine processing) to apply processing thereto. The intensity distribution measuring device 200 is used in a production line, a laboratory, or the like. The intensity distribution measuring device 200 comprises an auxiliary attenuation unit 210, an adjustment unit 220, a measuring unit 230, a display unit 240, an operating unit 250, and a control unit 260.

The auxiliary attenuation unit 210 is installed on a downstream side of the optical attenuator 100 along an optical axis C, and attenuates the intensity of the laser beam L3 that is split by the optical attenuator 100, as illustrated in FIG. 1, FIG. 3, and FIG. 4.

The auxiliary attenuation unit 210 assists the attenuation of the laser beam L by the optical attenuator 100 and is not an indispensable configuration.

The auxiliary attenuation unit 210 is provided with component members in the order of: a sampling prism 211, an air cooling damper 212, a first reflection mirror 213, a second reflection mirror 214, a first neutral density filter 215A, a second neutral density filter 215B, a third neutral density filter 215C, and a fourth neutral density filter 215D, from the upstream side of the optical axis C (the optical attenuator 100 side) toward the downstream side (the detector 231 side of the measuring unit 230). The sampling prism 211 to the fourth neutral density filter 215D are installed in a region between a collimating part 220M and a capacitor part 220N of the adjustment unit 220.

The sampling prism 211 attenuates the intensity of the laser beam L3 that is split by the sampling prism 101 of the optical attenuator 100. The sampling prism 211 is disposed opposing the sampling prism 101 of the optical attenuator 100 in a direction along the processing region (welding region) of the work piece. A laser beam L3 reflected at the sampling prism 101 of the optical attenuator 100 is made incident on the sampling prism 211. The sampling prism 211 transmits a portion of the laser beam L3 (for example 90%) from an interface to the outside while propagating the same to the air cooling damper 212, and reflects a portion of the laser beam L3 (for example 10%) at an interface while propagating the same toward the first reflection mirror 213. The sampling prism 211 is formed of a prism-shaped glass in the same manner as the sampling prism 101. The inclined surface of the prism shape corresponds to the interface.

The air cooling damper 212 attenuates the laser beam that is transmitted from the interface of the sampling prism 211 to the outside, by irradiating the laser beam onto a gas. The air cooling damper 212 is adjacent to the sampling prism 211. The air cooling damper 212 is, for example, made of metal and is formed in a box shape with a cavity therein. In particular, the air cooling damper 212 may be formed of copper or aluminum with excellent thermal conductivity, or of copper alloy or aluminum alloy that has a certain degree of strength. The air cooling damper 212 multiply reflects the laser beam while attenuating the laser beam by the cavity between the sampling prism 211 and the air cooling damper.

The first reflection mirror 213 reflects a laser beam to change the optical axis C thereof. The first reflection mirror 213 is disposed opposing the sampling prism 211 in a direction along the processing region (welding region) of the workpiece. The first reflection mirror 213 reflects the laser beam that has been propagated from the sampling prism 211 toward a direction along the surface of the workpiece, while propagating the laser beam toward the second reflection mirror 214. The first reflection mirror 213 turns the optical axis C of the laser beam by 90°. The first reflection mirror 213 is formed by, for example, vapor deposition of a metal, such as aluminum, on one surface of a prism-shaped glass. In the first reflection mirror 213, the surface to which metal is vapor deposited becomes the reflective surface for the laser beam. In the first reflection mirror 213, by being formed in a prism shape, it is easier to adjust the angles by referencing the shape thereof (one angle of the three angles is perpendicular), compared to when formed in a plate shape.

The second reflection mirror 214 reflects the laser beam to change the optical axis C thereof. The second reflection mirror 214 is disposed opposing the first neutral density filter 215A in a direction along the processing region (welding region) of the workpiece. The second reflection mirror 214 reflects the laser that has been propagated from the first reflection mirror 213 toward a direction along the surface of the workpiece, while propagating the laser beam toward the first neutral density filter 215A to the fourth neutral density filter 215D. The second reflection mirror 214 turns the optical axis C of the laser beam by 90°. The second reflection mirror 214 is has the same specifications as the first reflection mirror 213.

The first neutral density filter 215A, the second neutral density filter 215B, the third neutral density filter 215C, and the fourth neutral density filter 215D adjust the intensity of the laser beam to match the light resistance property of the detector 231. The first neutral density filter 215A is disposed opposing the second reflection mirror 214 along the in-plane direction of the workpiece. The first neutral density filter 215A to the fourth neutral density filter 215D are disposed at regular intervals between the second reflection mirror 214 and the capacitor part 220N. The first neutral density filter 215A to the fourth neutral density filter 215D finely adjust the intensity of the laser beam that has been greatly attenuated by the optical attenuator 100 and the sampling prism 211.

For example, when configuring a so-called reflection type plate-like window material that is transparent to light having the wavelength of a laser beam, on which is vapor deposited a reflective film with a reflectance of several tens % to several % (for example thin film made of chromium), is used for the first neutral density filter 215A to the fourth neutral density filter 215D. On the other hand, when configuring as a so-called absorption type, as one example, a window material containing an absorption material that absorbs light having a wavelength of a laser beam at a constant rate, is used for the first neutral density filter 215A to the fourth neutral density filter 215D. The first neutral density filter 215A to the fourth neutral density filter 215D have mutually different attenuation rates, such as 90%, 50%, 10%, and 1%. The first neutral density filter 215A to the fourth neutral density filter 215D oppose (direct opposition) the optical axis C so as to be orthogonal to the optical axis C. A plurality of neutral density filters may be used, as in the embodiment, or only one may be used. By using a plurality of neutral density filters having different attenuation rates in combination, it becomes easier to attenuate the laser beam to any intensity. That is, it is possible to finely adjust the intensity of the laser beam by the first neutral density filter 215A to the fourth neutral density filter 215D, without changing the configuration of the optical attenuator 100 and the sampling prism 211.

The adjustment unit 220 adjusts the angle between the optical axis C and the laser beam, which has been deflected from the optical axis C and propagated, to become relatively small, such that the deflected laser beam is propagated toward the detection area 231a, as illustrated in FIG. 1 to FIG. 3.

The adjustment unit 220 comprises a first adjustment part (for example a collimating part 220M) and a second adjustment part (for example a capacitor part 220N).

The collimating part 220M propagates the laser beam toward the detector 231, as parallel light or close to parallel light, along the optical axis C. The collimating part 220M realizes an infinity correction section. The collimating part 220M is configured from an objective lens comprising lenses 221, 222, 223, and 224. A lens used for microscopes, or the like, can be applied to such an objective lens. The collimating part 220M is, for example, incorporated in a narrow space of a production line, and propagates the laser beam toward a direction along the processing region (welding region) of a workpiece, in order to prevent interference with the workpiece. By selecting an objective lens with a numerical aperture of, for example NA=0.3 or more, the objective lens can sufficiently collimate the laser beam that is scanned by a galvanometer mirror 311 and propagate the same to the detection area 231a.

The capacitor part 220N propagates the laser beam toward the detector 231 in a condensed light state, while bringing the laser beam close to the optical axis C. The capacitor part 220N is disposed downstream of the capacitor part 220M along the optical axis C. The capacitor part 220N is configured from an imaging lens comprising lenses 225, 226, 227, and 228. A lens used for microscopes, or the like, can be applied to such an imaging lens. The capacitor part 220N is configured to be capable of correcting the angle of the laser beam with the imaging lens. In addition, by configuring such that the focal length of the imaging lens, comprising lenses 225, 226, 227, and 228, to be, for example, equivalent to the focal length of the laser beam to a workpiece that is placed on a welding bench in a production line, it is possible to carry out the measurement of the laser beam by the measuring unit 230 in which the profiler of the laser beam at the time of laser welding is accurately reproduced.

The measuring unit 230 is installed opposing the optical axis C of the laser beam, to measure the intensity distribution of the laser beam that is irradiated on the detection area 231a, as illustrated in FIGS. 1-4.

The measuring unit 230 comprises a detector 231. The detector 231 is installed on the most downstream side along the optical axis C. The detection area 231a of the detector 231 comprises a CCD or a CMOS, and opposes (direct opposition) the optical axis C so as to be orthogonal to the optical axis C. A camera-type detector 231 may be used. In addition, a scanner type that uses the knife edge method, a scanner type that uses the slit method, or a scanner type that uses the pinhole method, may be used as the detector 231. When using, for example, a scanner type according to the slit method as the detector 231, a laser beam is made incident in a state in which a slit provided in front of a photo detector is rotated. When a laser beam that has passed through the slit is made incident onto a detector in the detector 231, an electromotive force is generated, and the intensity of the laser beam is detected as the magnitude of a current value. The detector 231 detects the distribution of the laser beam based on the position of the slit.

Here, the detection accuracy of the detector 231 generally depends on the incidence angle of the laser beam. If a laser beam is made incident onto the detection area 231a perpendicularly, the detector 231 can most accurately detect the intensity distribution of the laser beam. That is, by adjusting, with the adjustment unit 220, the angle formed between the optical axis C and the laser beam, which is deflected from the optical axis C and propagated, to become relatively small, while making the laser beam incident close to perpendicular with respect to the detection area 231a, it is possible to accurately detect the intensity distribution of the laser beam.

The display unit 240 displays the intensity distribution of the laser beam measured by the measuring unit 230, as illustrated in FIG. 1 and FIG. 3.

The display unit 240 comprises a monitor 241. The monitor 241 is connected to the detector 231 of the measuring unit 230. The monitor 241 receives the data of the intensity distribution of the laser beam obtained by the detector 231 and displays the data. For example, a worker in a production line carries out an optical adjustment while visually observing the intensity distribution of the laser beam on the monitor 241. For example, the monitor 241 displays the intensity of the laser beam on a vertical axis and displays the distribution of the laser beam in-plane on a horizontal axis (two axes). The monitor 241 displays the intensity distribution of the laser beam three-dimensionally, or displays the same from above downward in a bird's-eye view, or displays the same from the side.

The operating unit 250 adjusts the changing unit 310 of the laser oscillator 300 based on the measurement result of the intensity distribution of the laser beam by the measuring unit 230, and reduces the diameter of the laser beam, as illustrated in FIG. 1 and FIG. 3.

The operating unit 250 comprises a control circuit 251. The control circuit 251 is electrically connected to a straight stage of the changing unit 310 of the laser oscillator 300. Here, the changing unit 310 is provided on the laser oscillator 300 side, and changes the position along the optical axis C of the galvanometer mirror 311, which reflects the laser beam, to the upstream side or the downstream side. The laser beam from the laser oscillator 300 is reflected by the galvanometer mirror 311, transmitted through an fθ) lens 312, and propagated to the sampling prism 101 of the optical attenuator 100. The fθ lens 312 makes constant the scanning speed of the laser beam by the galvanometer mirror 311. The control circuit 251 receives the measurement result of the intensity distribution of the laser beam from the measuring unit 230, controls the straight stage of the changing unit 310 based on the received measurement result, and adjusts the position along the optical axis C of the galvanometer mirror 311, such that the diameter of the laser beam becomes a minimum.

The control unit 260 controls the changing unit 310 of the laser oscillator 300 via the operating unit 250, in addition to controlling the measuring unit 230 and the display unit 240, as illustrated in FIG. 1 and FIG. 3.

The control unit 260 comprises a controller 261. The controller 261 comprises a ROM, a CPU, and a RAM. The ROM (Read Only Memory) stores control programs for the intensity distribution measuring device 200 and the changing unit 310 of the laser oscillator 300, and data of the ideal intensity distribution, which becomes the reference for the laser beam. A plurality of control programs are stored in the ROM, for example a program for adjusting the changing unit 310 such that the diameter of the laser beam becomes small, based on the measurement result of the intensity distribution of the laser beam by the measuring unit 230. The CPU (Central Processing Unit) executes the control programs. The RAM (Random Access Memory) temporarily stores data of the intensity distribution of the laser beam that is measured by the detector 231, and the like.

The optical attenuator 100 according to the embodiment described above exerts the actions and effects according to the following configurations.

The optical attenuator 100 comprises a branch member (sampling prism 101), an expansion member (biconcave lens 102), and an absorption member 103. The sampling prism 101 splits the light (laser beam L) to be measured. The biconcave lens 102 expands the shape of the split laser beam L1. The absorption member 103 absorbs the energy of the expanded laser beam L2. Here, the absorption member 103 comprises a light receiving part 103a, a first distribution part 103b, and a second distribution part 103c. The light receiving part 103a receives the expanded laser beam L2. The first distribution part 103b is adjacent to the light receiving part 103a, introduces a cooling medium (cooling water W), which absorbs heat generated in the light receiving part 103a by the laser beam L2, from a first opening 103d, and distributes the medium. The second distribution part 103c leads out or introduces the cooling water W, which moves through a communicating portion 103e that communicates with the first distribution part 103b, from a second opening 103f, and distributes the cooling water.

Accordingly, an optical attenuator 100 configured in this manner distributes the cooling water W that has absorbed the energy of the laser beam L2, which is obtained by splitting and expanding the laser beam L to be measured, to the first distribution part 103b and the second distribution part 103c that communicate with each other via the communicating portion 103e, while attenuating the same. That is, the optical attenuator 100 rapidly conducts the heat of the laser beam L2, which has come in contact with and that has been absorbed by the light receiving part 103a, to a portion that is not in contact with the light receiving part 103a, while diffusing and absorbing the heat therein, with the cooling water W that has been mixed using the communicating portion 103e. Accordingly, the optical attenuator 100 is capable of greatly increasing the endothermic efficiency of the cooling water W. Therefore, the optical attenuator 100 is capable of sufficiently attenuating, by means of a simple configuration, a portion of the light to be measured.

In addition, according to an optical attenuator 100 configured in this manner, if the area of the opening of the communicating portion 103e was sufficiently smaller compared to the area of the portion where the first distribution part 103b and the second distribution part 103c are adjacent to each other, it is possible to easily stir and distribute the cooling water W in the absorption member 103. That is, as the cooling water W is moved in a temporarily compressed state when flowing into the communicating portion 103e from the first distribution part 103b or the second distribution part 103c, and is moved in a temporarily expanded state when flowing out from the communicating portion 103e to the second distribution part 103c or the first distribution part 103b, the cooling water W is stirred bordering the vicinity of the communicating portion 103e. Therefore, the optical attenuator 100 is capable of absorbing heat by uniformly distributing the cooling water W in the absorption member 103. Furthermore, the optical attenuator 100 is capable of sufficiently promoting heat absorption in the light receiving part 103a, by the cooling water W that has been stirred and the flow rate of which has been partially changed.

In addition, according to an optical attenuator 100 configured in this manner, it is possible to increase the contact area with the cooling water W in the absorption member 103, compared to a configuration in which the cooling water W is distributed to only one distribution part, by distributing the cooling water W between the first distribution part 103b and the second distribution part 103c. That is, the entire absorption member 103 can function as a heat sink, by conducting the heat of the laser beam L2 that is absorbed by the light receiving part 103a also to the first distribution part 103b and the second distribution part 103c. In the case of an absorption member comprising the same internal volume, since the contact area with the cooling water W is increased by partitioning the inside with a plurality of distribution parts, it is possible to promote heat dissipation from the cooling water W. In particular, since the cooling water W is present on both sides of the portion where the first distribution part 103b and the second distribution part 103c are adjacent to each other, it is possible to increase the heat dissipation efficiency of the cooling water W.

Additionally, according to an optical attenuator 100 configured in this manner, if the cooling water were distributed from the first distribution part 103b, which is adjacent to the light receiving part 103a, toward the second distribution part 103c, it is possible to promptly distribute the cooling water W, which has absorbed the heat inside the first distribution part 103b, toward the adjacent second distribution part 103c, in order to exhaust the heat. If the cooling water W is configured to be directly discharged (led out) from one distribution part (first distribution part) to the outside, unlike in the present embodiment, a pressure loss can occur at the drain part (lead out part) and water discharge is easily inhibited; therefore, discharging heat is not easy.

In addition, since the configuration is simple, an optical attenuator 100 configured in this manner can be sufficiently disposed and used, for example, in areas that have been given up on, due to it being difficult to dispose in a relatively narrow space, such as a production line of a laser welding process for fine workpieces.

Furthermore, the optical attenuator 100 may be configured such that the first opening 103d is formed on the outer edge of the first distribution part 103b, and the communicating portion 103e is formed in the center of the portion in which the first distribution part 103b and the second distribution part 103c are adjacent to each other.

According to an optical attenuator 100 configured in this manner, it is possible to propagate and distribute the cooling water W between the outer edge and the center of the first distribution part 103b. That is, the energy of the laser beam L2 is absorbed by the cooling water W that is distributed between the radially outward side and the radially inward side in the first distribution part 103b. Therefore, the optical attenuator 100 is able to efficiently attenuate a portion of the light to be measured.

Furthermore, in the optical attenuator 100, the first distribution part 103b may be formed in a cylindrical shape, and the first opening 103d may be configured to introduce or lead out the cooling water W in a circumferential direction along the inner circumferential surface of the first distribution part 103b.

According to an optical attenuator 100 configured in this manner, it is possible to distribute the cooling water W while cyclically winding the cooling water between the outer edge and the center of the first distribution part 103b. That is, the energy of the laser beam L2 is evenly absorbed by the cooling water W which is cyclically wound and distributed inside the first distribution part 103b. Therefore, the optical attenuator 100 is able to extremely efficiently attenuate a portion of the light to be measured.

Furthermore, the optical attenuator 100 may be configured such that the second opening 103f is formed on the outer edge of the second distribution part 103c.

According to an optical attenuator 100 configured in this manner, it is possible to propagate and distribute the cooling water W between the center and the outer edge of the second distribution part 103c. That is, the cooling water W is distributed between the radially outward side and the radially inward side in the second distribution part 103c, while being led out or introduced. Therefore, the optical attenuator 100 is able to efficiently attenuate a portion of the light to be measured.

Furthermore, in the optical attenuator 100, the second distribution part 103c may be formed in a cylindrical shape, and the second opening 103f may be configured to lead out or introduce the cooling water W in a circumferential direction along the inner circumferential surface of the second distribution part 103c.

According to an optical attenuator 100 configured in this manner, it is possible to distribute the cooling water W while cyclically winding the cooling water between the center and the outer edge of the second distribution part 103c. That is, the cooling water W is evenly led out or introduced while being cyclically wound and distributed in the second distribution part 103c. Therefore, the optical attenuator 100 is able to extremely efficiently attenuate a portion of the light to be measured.

Furthermore, the optical attenuator 100 may be configured such that the light receiving part 103a, and the portion where the first distribution part 103b and the second distribution part 103c are adjacent to each other, are respectively tilted with respect to the horizontal direction.

An optical attenuator 100 configured in this manner is particularly suitable for a configuration to receive a laser beam L that has been made incident to the light receiving part 103a along the direction of gravity. That is, the optical attenuator is suitable for a general-purpose optical system that carries out processing while propagating a laser beam L along the direction of gravity (for example, from the upper side to the lower side). Here, the optical attenuator 100 is able to evenly distribute the cooling water W by means of multiple reflection (multiple collisions) in the portion where the first distribution part 103b and the second distribution part 103c are adjacent to each other.

In particular, according to an optical attenuator 100 configured in this manner, although a tilt is generated inside the absorption member 103 and the cooling water W is easily stagnated structurally, the distribution between the first distribution part 103b (functioning as a cooling part) and the second distribution part 103c (functioning as a heat discharging part) becomes smooth due to the cooling water W that is mixed using the communicating portion 103e, a large-scale constant temperature circulating water tank 106 is not required.

The optical attenuator according to modified example 1 of the embodiment will be described, with reference to FIGS. 8A and 8B. The optical attenuator according to modified example 1 of the embodiment is different from the optical attenuator 100 of the embodiment in the configuration of the absorption members 113 and 114. In the optical attenuator according to modified example 1 of the embodiment, the same reference symbols are used for configurations that are the same as the embodiment described above, and overlapping descriptions are omitted.

The configuration of an absorption member of an optical attenuator according to modified example 1 of the embodiment, and a method of absorbing the laser beam L2, will be described with reference to FIGS. 8A and 8B.

Figure 8A:
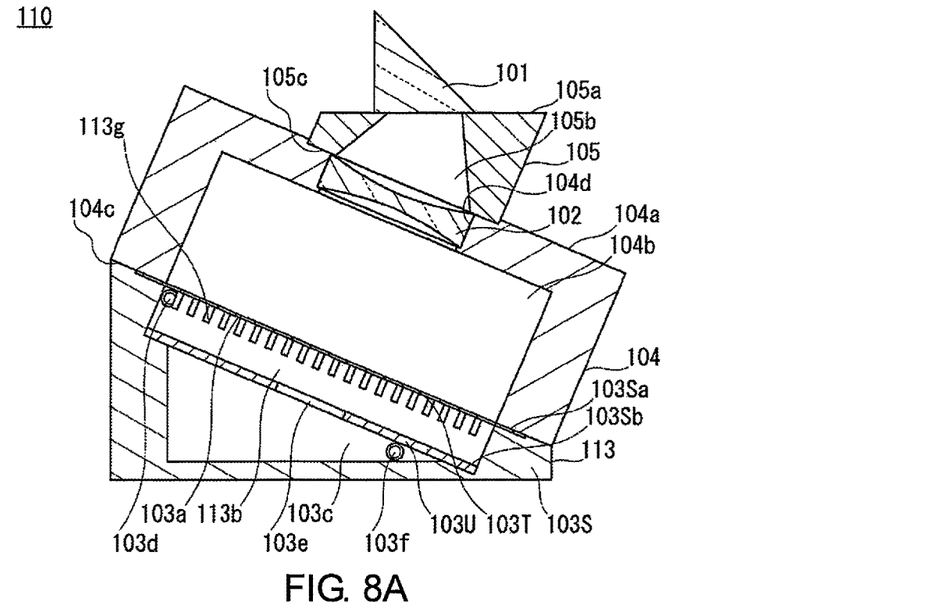
FIGS. 8A and 8B are cross sectional side views illustrating two examples of the optical attenuator according to a modified example 1 of the embodiment.

FIG. 8A is a cross sectional side view illustrating the optical attenuator according to one example the modified example 1 of the embodiment of the modified example 1. FIG. 8B is a view illustrating is a cross sectional side view illustrating the optical attenuator according to another example of the optical attenuator of the modified example 1.

FIG. 8A illustrates an optical attenuator 110, which is one example. In the optical attenuator 110, the absorption member 113 has a projection part 113g that protrudes toward the first distribution part 113b, in a portion of the light receiving part 103a that faces the first distribution part 113b. The light receiving part 103a increases the surface area that faces the first distribution part 113b using the projection part 113g. The projection part 113g is made of copper or aluminum with excellent thermal conductivity, and a plurality thereof are formed on the light receiving part 103a at regular intervals. The projection part 113g may be integrally formed with the light receiving part 103a (formed as one member). The projection part may be annularly formed along the flow channel of the cooling water W, or formed in a conical shape that is pointed toward the first distribution part 113b, in order to smoothen the distribution of the cooling water W.

Figure 8B:
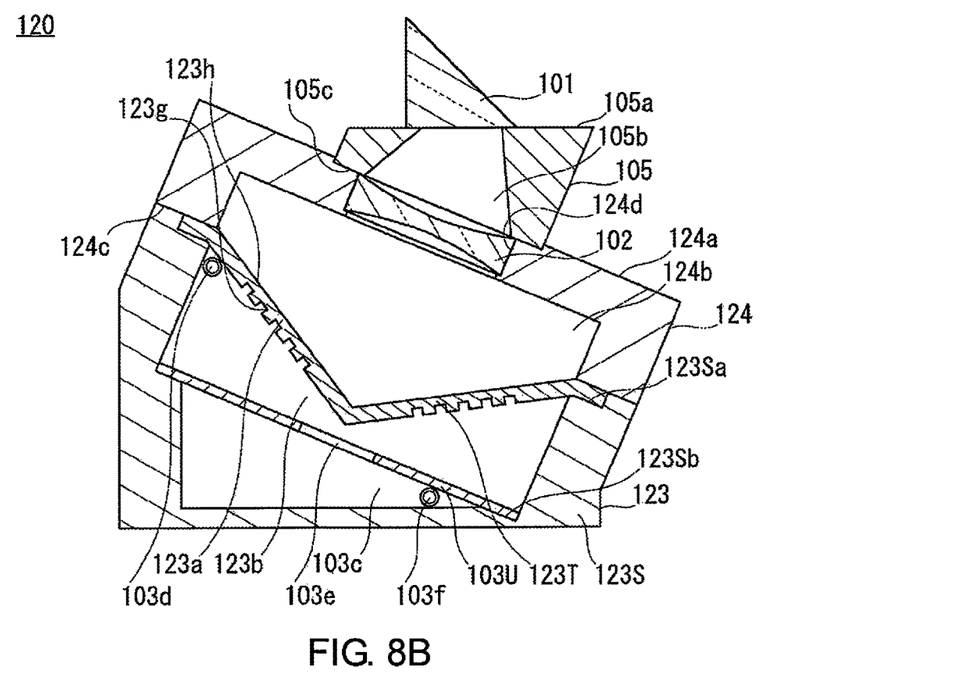

FIG. 8B illustrates an optical attenuator 120, which is another example. In the optical attenuator 120, the absorption member 123 has a recessed part 123h that is recessed toward the first distribution part 123b, in a portion of the light receiving part 123a that receives the laser beam L2. The heat-absorbing plate 123T corresponds to the light receiving part 123a. The heat-absorbing plate 103T is made of copper or aluminum with excellent thermal conductivity, and comprises a recessed part 123h comprising a conical shape, in which the center is greatly recessed on the side that faces the biconcave lens 102. The light receiving part 123a multiply reflects the laser beam L2 by the recessed part 123h portion, and conducts the heat caused by the laser beam L2 to the cooling water W in the first distribution part 123b, each time a reflection occurs. The recessed part 123g is made of copper or aluminum with excellent thermal conductivity, and a plurality thereof are formed at regular intervals on the side of the light receiving part 123a that faces the separation plate 103U. The recessed part 123g is integrally formed with the light receiving part 123a. The recessed part 123g may be annularly formed along the flow channel of the cooling water W, or formed in a circular arc shape that is recessed inwardly, in order to smoothen the distribution of the cooling water W.

The chassis 123S is basically the same shape as the chassis 103S, but is configured to be elongated in the vertical direction, in order to attach a heat-absorbing plate 123T that is larger than the heat-absorbing plate 103T. The first support member 124 is basically the same shape as the first support member 104, but is configured to be reduced in the vertical direction, since the optical path length of the laser beam L2 is satisfied by the recessed part 123h that is provided in the heat-absorbing plate 123T.

The optical attenuator according to the modified example 1 of the embodiment described above exerts the actions and effects according to the following configurations.

In the optical attenuator 110, the absorption member 113 forms a projection part 113g that protrudes toward the first distribution part 113b, in a portion of the light receiving part 113a that faces the first distribution part 113b.

According to an optical attenuator 110 configured in this manner, it is possible to efficiently conduct heat that is caused by the laser beam L2 to the cooling water W in the first distribution part 113b, by the light receiving part 113a, in which the surface area that faces the first distribution part 113b is increased by using the projection part 113g. Therefore, the optical attenuator 110 is able to efficiently attenuate a portion of the light to be measured.

Furthermore, the optical attenuator 120 may be configured such that the absorption member 123 forms a recessed part 123h that is recessed toward the first distribution part 123b, in a portion of the light receiving part 123a that receives the laser beam L2.

According to an optical attenuator 120 configured in this manner, it is possible to multiply reflect the laser beam L2 by the recessed part 123h portion that is formed in the light receiving part 123a, and conduct the heat caused by the laser beam L2 to the cooling water W in the first distribution part 123b, each time a reflection occurs. Therefore, the optical attenuator 120 is able to efficiently attenuate a portion of the light to be measured.

The optical attenuator according to modified example 2 of the embodiment will be described, with reference to FIGS. 9A to 9D. The optical attenuator according to modified example 2 of the embodiment is different from the optical attenuator 100 of the embodiment in the configuration of the expansion member (uniconcave lens 121, concave meniscus lens 122, combination lens 123, and diffraction grating 124). In the optical attenuator of modified example 2 of the embodiment, only the expansion member will be described.

The configuration of an expansion member of an optical attenuator according to modified example 2 of the embodiment, and a method of expanding the laser beam L1, will be described with reference to FIGS. 9 A to 9D.

Figure 9A:
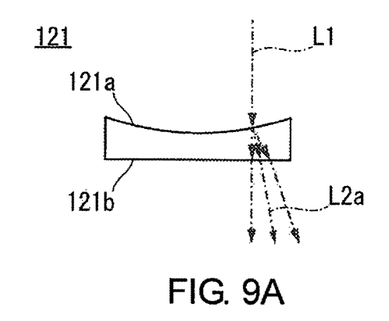
FIGS. 9A to 9D are schematic views illustrating four examples of the expansion member of the optical attenuator according to modified example 2 of the embodiment.
Figure 9B:
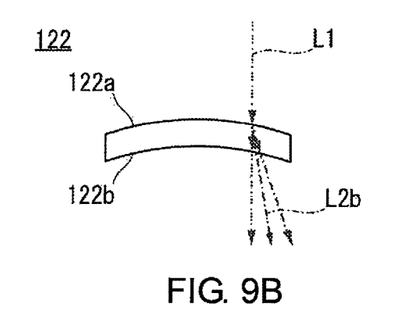
Figure 9C:
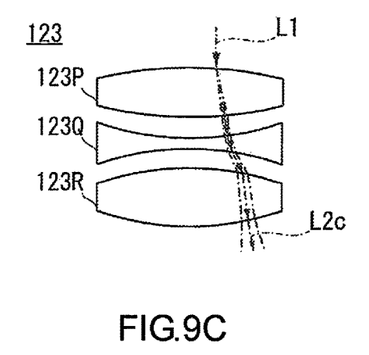
Figure 9D:
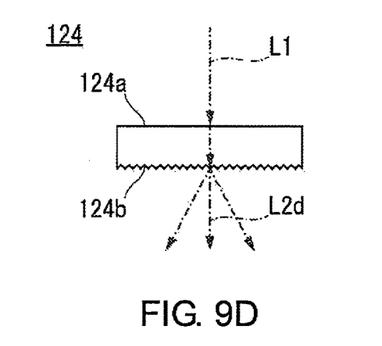

FIG. 9A is a schematic view illustrating the uniconcave lens 121 as a first example of the expansion member of the optical attenuator. FIG. 9B is a schematic view illustrating the concave meniscus lens 122 as a second example of the expansion member of the optical attenuator. FIG. 9C is a schematic view illustrating the combination lens 123 of a third example of the expansion member of the optical attenuator. FIG. 9D is a schematic view illustrating the diffraction grating 124 as a fourth example of the expansion member of the optical attenuator.

FIG. 9A illustrates a uniconcave lens 121 corresponding to a first example of the expansion member. The uniconcave lens 121 makes the laser beam L1 propagated from the sampling prism 101 incident on a concave incident surface 121a while expanding the same, and emits the laser beam from a planar emitting surface 121b. The shape and propagation direction of the laser beam L2a emitted from the uniconcave lens 121 can be arbitrarily set by optimizing the incident angle of the laser beam L1 with respect to the incident surface 121a, the curvature radius of the incident surface 121a, the position where the laser beam L1 is made incident (between the optical axis to the outer perimeter edge of the lens), and the material (the refractive index corresponding to the wavelength of the laser beam L).

FIG. 9B illustrates a concave meniscus lens 122 corresponding to a second example of the expansion member. The concave meniscus lens 122 makes the laser beam L1 propagated from the sampling prism 101 incident on a convex incident surface 122a, and emits the laser beam from a concave emitting surface 122b while expanding the same. The shape and propagation direction of the laser beam L2b emitted from the concave meniscus lens 122 can be arbitrarily set by optimizing the incident angle of the laser beam L1 with respect to the incident surface 122a, the curvature radius of the incident surface 122a, the curvature radius of the emitting surface 122b, the position where the laser beam L1 is made incident, the material, and the like.

FIG. 9C illustrates a combination lens 123 corresponding to a third example of the expansion member. The combination lens 123 is a lens that combines a biconvex lens 123P, a biconcave lens 123Q, and a biconvex lens 123R. The shape and propagation direction of the laser beam L2c emitted from the combination lens 123 can be arbitrarily set according to the specification of the combination lens 123. In particular, it is easy with the combination lens 123 to emit a laser beam L2c toward a predetermined position.

FIG. 9D illustrates a diffraction grating 124 corresponding to a fourth example of the expansion member. The diffraction grating 124 makes the laser beam L1 propagated from the sampling prism 101 incident from a planar incident surface 124a, and emits, while diffracting, the laser beam from an emitting surface 124b, on which fine linear grooves are periodically formed. The shape and propagation direction of the laser beam L2d emitted from the diffraction grating 124 can be arbitrarily set by optimizing specifications, such as the incident angle of the laser beam L1 with respect to the incident surface 124a, the blaze angle at the emitting surface 124b, and the like. In particular, the diffraction grating 124 is able to emit a laser beam L2d that has been dispersed in a plurality of orders toward a predetermined location.

The optical attenuator according to the modified example 2 of the embodiment described above exerts the actions and effects according to the following configurations.

The optical attenuator irradiates laser beams L2a-L2d that have been expanded or diffracted by the expansion member (uniconcave lens 121, concave meniscus lens 122, combination lens 123, or diffraction grating 124) to the light receiving part 103a.

According to an optical attenuator configured in this manner, the light receiving part 103a of the absorption member 103 is able to receive laser beams L2a-L2d, subjected to beam expansion to an arbitrary shape by the expansion member. That is, the light receiving part 103a is able to receive the laser beams L2a-L2d in a wide range according to the beam expansion ratio, in order to reduce the intensity of the laser beams L2a-L2d per unit area. That is, the heat of the light receiving part 103a is sufficiently absorbed and cooled by the cooling water W in the adjacent first distribution part 103b, without being overheated by the laser beams L2a-L2d. Therefore, the optical attenuator 100 is able to efficiently attenuate a portion of the light to be measured.

The optical attenuator according to modified example 3 of the illustrative embodiment will be described, with reference to FIG. 10. The optical attenuator according to modified example 3 of the embodiment is different from the optical attenuator 100 of the illustrative embodiment in the configuration of the branch member (diffraction grating 131, window plate 132, and mirror 133). In the optical attenuator of modified example 3 of the embodiment, only the branch member will be described.

The configuration of a branch member of an optical attenuator according to modified example 3 of the embodiment, and a method of splitting the laser beam L, will be described with reference to FIG. 10.

Figure 10A:
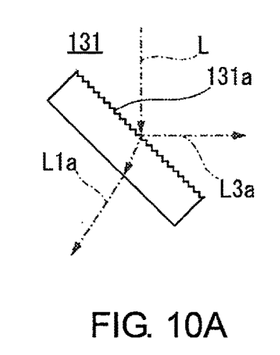
FIGS. 10A to 10C are schematic views illustrating three examples of the branch member of the optical attenuator according to modified example 3 of the embodiment.

FIG. 10A is a schematic view illustrating a diffraction grating 131 as a first example of the branch member of the optical attenuator. FIG. 10B is a schematic view illustrating a window plate 132 as a second example of the branch member of the optical attenuator. FIG. 10 C is a schematic view illustrating a mirror 133 as a third example of the branch member of the optical attenuator.

FIG. 10A illustrates a diffraction grating 131 corresponding to a first example of the branch member. The diffraction grating 131 transmits, reflects (diffracts) and splits a laser beam L emitted from the laser oscillator 300. The diffraction grating 131 transmits a laser beam L1a, corresponding to a large portion of the laser beam L, toward the light receiving part 103a, at the incident surface 131a on which fine linear grooves are periodically formed. On the other hand, the diffraction grating 131 reflects (diffracts) a laser beam L3a, corresponding to a very small portion of the laser beam L, toward the intensity distribution measuring device 200, at the incident surface 131a. The propagation direction and intensity of the laser beam L1a that heads toward the light receiving part 103a, and the propagation direction and intensity of the laser beam L3a that heads toward the intensity distribution measuring device 200, are set by optimizing specifications, such as the blaze angle of the incident surface 131a of the diffraction grating 131. In particular, if the diffraction grating 131 is configured as a transmission type, and a metal film is not vapor deposited on the incident surface 131a thereof, it is possible to transmit a large portion of the irradiated laser beam L and propagate the same toward the light receiving part 103a.

Figure 10B:
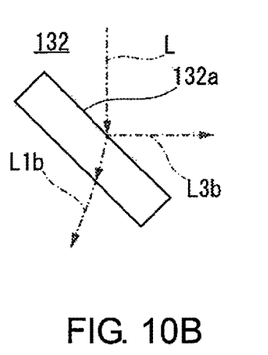

FIG. 10B illustrates a window plate 132 corresponding to a second example of the branch member. The window plate 132 transmits, reflects, and splits a laser beam L emitted from the laser oscillator 300. The window plate 132 is made of, for example, a plate-shaped glass material, and transmits a laser beam L1b, corresponding to a large portion of the laser beam L, toward the light receiving part 103a, at the incident surface 132a. On the other hand, the window plate 132 reflects a laser beam L3b, corresponding to a very small portion of the laser beam L, toward the intensity distribution measuring device 200, at the incident surface 132a. The propagation direction and intensity of the laser beam L1b that heads toward the light receiving part 103a, and the propagation direction and intensity of the laser beam L3b that heads toward the intensity distribution measuring device 200, are set by optimizing specifications, such as the angle of the incident surface 132a, the material of the window plate 132, and the like.

Figure 10C:
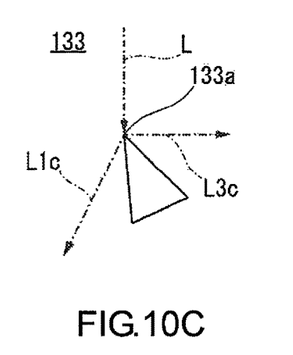

FIG. 10C illustrates a mirror 133 corresponding to a third example of the branch member. The mirror 133 scatters and splits a laser beam L emitted from the laser oscillator 300. The mirror 133 is made of, for example, a prism-shaped glass material, on the surface of which a metal film is vapor deposited. The mirror 133 transmits a laser beam L1c, corresponding to a large portion of the laser beam L that is irradiated onto a corner portion 133a thereof and scattered, toward the light receiving part 103a. On the other hand, the mirror 133 reflects a laser beam L3c, corresponding to a very small portion of the laser beam L, at the corner portion 133a thereof, toward the intensity distribution measuring device 200. The propagation direction and intensity of the laser beam L1c that heads toward the light receiving part 103a, and the propagation direction and intensity of the laser beam L3c that heads toward the intensity distribution measuring device 200, are set by optimizing the shape and the angle of the corner portion 133a of the mirror 133.

The optical attenuator according to the modified example 3 of the embodiment described above exerts the actions and effects according to the following configurations.

The optical attenuator transmits or reflects one laser beam L1 of the laser beam L that is irradiated on the branch member (diffraction grating 131, window plate 132, or mirror 133) toward the light receiving part 103a, and reflects or diffracts the other laser beam L3 of the laser beam L that is irradiated on the branch member toward the outside (intensity distribution measuring device 200).

According to an optical attenuator configured in this manner, the ratio of the light intensity of the laser beam L1 that is propagated toward the biconcave lens 102 and ultimately attenuated, and the light intensity of the laser beam L3 that is propagated toward the intensity distribution measuring device 200 and the intensity distribution of which is measured, can be freely set with the branch member. Therefore, the optical attenuator is able to freely set the attenuation rate of the light to be measured.

Furthermore, according to an optical attenuator configured in this manner, the angles of the laser beams L1a-L1c that are propagated toward the biconcave lens 102 can be freely set with the branch member. Therefore, the optical attenuator is able to propagate the laser beams L1a-L1c that is split by the branch member in an arbitrary direction, according to the specification of the biconcave lens 102, and the specification of the light receiving part 103a that is disposed on the downstream side of the biconcave lens 102.

According to an optical attenuator configured in this manner, the angles of the laser beams L3a-L3c that are propagated toward the intensity distribution measuring device 200 can be freely set with the branch member. Therefore, it becomes easy to measure the laser beam L3 in the intensity distribution measuring device 200.

The optical attenuator according to modified example 4 of the illustrative embodiment will be described, with reference to FIG. 11. The optical attenuator according to modified example 4 of the embodiment is different from the optical attenuator 100 of the embodiment in the configuration of the distribution part (141b, 141c and 141d) relating to the absorption member 141. In the optical attenuator of modified example 4 of the embodiment, only the absorption member will be described.

The configuration of an absorption member of an optical attenuator according to modified example 4 of the embodiment, and a method of absorbing the laser beam L2, will be described with reference to FIG. 11.

Figure 11:
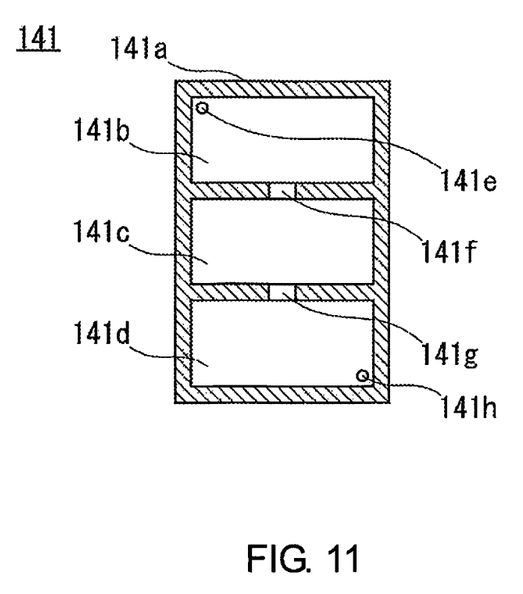
FIG. 11 is a schematic view illustrating the absorption member of the optical attenuator according to modified example 4 of the embodiment.

FIG. 11 is a schematic diagram illustrating the absorption member 141 of the optical attenuator according to modified example 4 of the embodiment.

The absorption member 141 receives the laser beam L2 that is expanded by the biconcave lens 102 in the light receiving part 141a. The light receiving part 141a is adjacent to the distribution part 141b. The distribution part 141b, the distribution part 141c, and the distribution part 141d are each partitioned into a rectangular shape, and are formed to be adjacent to each other.

A first opening 141e is opened in a circumferential direction along the inner circumferential surface of the distribution part 141b, and introduces or leads out cooling water W, which absorbs heat generated in the light receiving part 141a by the laser beam L2, and distributes the cooling water. The first communicating portion 141f is formed in the center of a portion where the distribution part 141b and the distribution part 141c are adjacent to each other, and distributes the cooling water W. The second communicating portion 141g is formed in the center of a portion where the distribution part 141c and the distribution part 141d are adjacent to each other, and distributes the cooling water W. The second opening 141h is opened in a circumferential direction along the inner circumferential surface of the distribution part 141d, and introduces or leads out the cooling water W, while distributing the same.

The distribution part 141b, the distribution part 141c, and the distribution part 141d are illustrated as having the same internal volume; however, the internal volumes may differ, for example, to become relatively larger near the light receiving part 141a. The absorption member 141 is integrally formed by copper or aluminum with excellent thermal conductivity.

The optical attenuator according to the modified example 4 of the illustrative embodiment described above exerts the actions and effects according to the following configurations.

In the optical attenuator, the absorption member 141 comprises three or more distribution parts (141b, 141c, and 141d), each of which moves and distributes the cooling water W.

According to an optical attenuator 110 configured in this manner, it is possible to adjust the distribution efficiency of the cooling water W, particularly in the distribution part 141b, which is adjacent to the light receiving part, by freely setting the number of distribution parts according to the intensity of the laser beam L2, or the like. Therefore, the optical attenuator 100 is able to efficiently attenuate a portion of the light to be measured.

Other than the foregoing, various modifications to the present invention based on the configurations described in the claims are possible, which also belong in the scope of the present invention.

For example, in the present illustrative embodiment, a configuration was described in which a liquid such as cooling water W is circulated inside the absorption member 103. However, the present invention is not limited to such a configuration; for example, a gaseous body, such as a gas with excellent heat absorbing performance may be circulated inside the absorption member 103.

In addition, in the present embodiment, a configuration was described in which cooling water W is circulated inside the absorption member 103 using a constant temperature circulating water tank 106. However, the present invention is not limited to such a configuration; for example, tap water that is supplied from a water pipe may be circulated inside the absorption member 103.

The invention claimed is:

1. An optical attenuator comprising:
a branch member that splits light to be measured into split light;
an expansion member that expands a shape of the split light into expanded light; and
an absorption member that absorbs energy of the expanded light,
the absorption member comprising:
  a light receiving part that receives the expanded light,
  a first distribution part disposed adjacent to the light receiving part and that introduces or leads out a medium from a first opening and that distributes the medium to absorb heat generated in the light receiving part by the light; and
  a second distribution part that leads out or introduces the medium from a second opening and distributes the medium through a communicating part that communicates with the first distribution part, the communicating portion being disposed in a portion where the first distribution part and the second distribution part are adjacent to each other,
  the medium being introduced from one of the first and second openings and leading out from the other of the first and second openings.

2. An optical attenuator comprising:
a branch member that splits light to be measured into split light;
an expansion member that expands a shape of the split light into expanded light; and
an absorption member that absorbs energy of the expanded light,
the absorption member comprising:
  a light receiving part that receives the expanded light;
  a first distribution part disposed adjacent to the light receiving part and that introduces or leads out a medium from a first opening and that distributes the medium to absorb heat generated by the light in the light receiving part;
  a second distribution part that leads out or introduces the medium from a second opening and distributes the medium through a communicating part that communicates with the first distribution part; and
  the light receiving part and a portion where the first and second distribution parts are adjacent to each other are each tilted with respect to a horizontal direction.

3. The optical attenuator according to claim 1, wherein the first opening is disposed on an outer edge of the first distribution part; and
the communicating portion is disposed in the center of a portion where the first and second distribution parts are adjacent to each other.

4. The optical attenuator according to claim 1, wherein the first distribution part has a cylindrical shape; and
the first opening introduces or leads out the medium in a circumferential direction along an inner circumferential surface of the first distribution part.

5. The optical attenuator according to claim 1, wherein the second opening is disposed on an outer edge of the second distribution part.

6. The optical attenuator according to claim 1, wherein the second distribution part has a cylindrical shape; and
the second opening leads out or introduces the medium in a circumferential direction along an inner circumferential surface of the second distribution part.

7. The optical attenuator according to claim 1, wherein the absorption member has a projection part that extends toward the first distribution part from a portion of the light receiving part that faces the first distribution part.

8. The optical attenuator according to claim 1, wherein the absorption member has a recessed part in a portion of the light receiving part receiving the light, and that is recessed toward the first distribution part.

9. The optical attenuator according to claim 1, wherein the expansion member irradiates the expanded light on the light receiving part.

10. The optical attenuator according to claim 1, wherein the branch member transmits or reflects one light portion from the light that is irradiated on the branch member toward the light receiving part, and reflects or diffracts another light portion from the light that is irradiated on the branch member toward the outside.

11. The optical attenuator according to claim 1, wherein the absorption member comprises three or more distribution parts, each of which moves and distributes the medium.

12. The optical attenuator according to claim 2, wherein the first opening is disposed on an outer edge of the first distribution part; and
the communicating portion is disposed in the center of a portion where the first and second distribution parts are adjacent to each other.

13. The optical attenuator according to claim 2, wherein the first distribution part has a cylindrical shape; and
the first opening introduces or leads out the medium in a circumferential direction along an inner circumferential surface of the first distribution part.

14. The optical attenuator according to claim 2, wherein the second opening is disposed on an outer edge of the second distribution part.

15. The optical attenuator according to claim 2, wherein the second distribution part has a cylindrical shape; and the second opening leads out or introduces the medium in a circumferential direction along an inner circumferential surface of the second distribution part.

16. The optical attenuator according to claim 2, wherein the absorption member has a projection part that extends toward the first distribution part from a portion of the light receiving part that faces the first distribution part.

17. The optical attenuator according to claim 2, wherein the absorption member has a recessed part in a portion of the light receiving part receiving the light, and that is recessed toward the first distribution part.

18. The optical attenuator according to claim 2, wherein the expansion member irradiates the expanded light on the light receiving part.

19. The optical attenuator according to claim 2, wherein the branch member transmits or reflects one light portion from the light that is irradiated on the branch member toward the light receiving part, and reflects or diffracts another light portion from the light that is irradiated on the branch member toward the outside.

20. The optical attenuator according to claim 2, wherein the absorption member comprises three or more distribution parts, each of which moves and distributes the medium.

* * * * *